(12) United States Patent
Tamai et al.

(10) Patent No.: US 10,626,297 B2
(45) Date of Patent: Apr. 21, 2020

(54) POLISHING COMPOSITION, POLISHING METHOD, AND METHOD FOR MANUFACTURING CERAMIC COMPONENT

(71) Applicant: FUJIMI INCORPORATED, Kiyosu-shi, Aichi (JP)

(72) Inventors: Kazusei Tamai, Aichi (JP); Shingo Otsuki, Aichi (JP); Tomoya Ikedo, Aichi (JP); Shota Hishida, Aichi (JP); Hiroshi Asano, Aichi (JP); Maiko Asai, Aichi (JP); Yuuichi Ito, Aichi (JP)

(73) Assignee: FUJIMI INCORPORATED, Kiyosu-Shi (JP)

( * ) Notice: Subject to any disclaimer, the term of this patent is extended or adjusted under 35 U.S.C. 154(b) by 0 days.

(21) Appl. No.: 15/538,432

(22) PCT Filed: Nov. 26, 2015

(86) PCT No.: PCT/JP2015/005880
§ 371 (c)(1),
(2) Date: Jun. 21, 2017

(87) PCT Pub. No.: WO2016/103575
PCT Pub. Date: Jun. 30, 2016

(65) Prior Publication Data
US 2017/0355881 A1 Dec. 14, 2017

(30) Foreign Application Priority Data
Dec. 26, 2014 (JP) ................. 2014-265059

(51) Int. Cl.
*C09G 1/02* (2006.01)
*C09K 3/14* (2006.01)
*C09G 1/00* (2006.01)
*B24B 37/00* (2012.01)

(52) U.S. Cl.
CPC .............. *C09G 1/02* (2013.01); *B24B 37/00* (2013.01); *C09G 1/00* (2013.01); *C09K 3/14* (2013.01); *C09K 3/1463* (2013.01)

(58) Field of Classification Search
CPC .......... C09G 1/02; C09K 3/1463; B24B 37/00
See application file for complete search history.

(56) References Cited

U.S. PATENT DOCUMENTS

| 4,808,463 A | * | 2/1989 | Yoshikatsu | ........... C04B 35/111 427/128 |
| 5,300,130 A | | 4/1994 | Rostoker | |
| 7,037,350 B2 | | 5/2006 | Small et al. | |
| 8,105,135 B2 | | 1/2012 | Laconto et al. | |
| 2004/0226917 A1 | | 11/2004 | Laconto et al. | |
| 2006/0135045 A1 | | 6/2006 | Bian et al. | |
| 2007/0087667 A1 | | 4/2007 | Laconto et al. | |
| 2008/0038996 A1 | | 2/2008 | Maejima et al. | |
| 2008/0057713 A1 | | 3/2008 | Desai et al. | |
| 2008/0153396 A1 | | 6/2008 | Laconto et al. | |
| 2012/0142258 A1 | | 6/2012 | Morinaga et al. | |

FOREIGN PATENT DOCUMENTS

| CN | 101273105 A | | 9/2008 | |
| CN | 103484026 A | | 1/2014 | |
| EP | 1 618 163 B1 | | 3/2007 | |
| EP | 2 365 043 | * | 9/2011 | ............... C09G 1/02 |
| JP | S60-155359 A | | 8/1985 | |
| JP | H04-283069 A | | 10/1992 | |
| JP | H05-093183 A | | 4/1993 | |
| JP | H07-179848 A | | 7/1995 | |
| JP | 2003-117806 A | | 4/2003 | |
| JP | 2006-045179 | * | 8/2004 | ............... A61K 6/06 |
| JP | 2006-045179 A | | 2/2006 | |
| JP | 2006-318952 A | | 11/2006 | |
| JP | 2006-524583 A | | 11/2006 | |
| JP | 2008-246668 A | | 10/2008 | |
| JP | 2008-290183 A | | 12/2008 | |
| JP | 2009-509784 A | | 3/2009 | |
| JP | 2010-513693 A | | 4/2010 | |
| JP | 2011-161570 A | | 8/2011 | |
| JP | 2011-183530 A | | 9/2011 | |
| JP | 2014-069260 A | | 4/2014 | |
| WO | WO-2007/041199 A2 | | 4/2007 | |
| WO | WO-2009/056491 A1 | | 5/2009 | |
| WO | WO-2009/111001 A2 | | 9/2009 | |

\* cited by examiner

*Primary Examiner* — Pegah Parvini
(74) *Attorney, Agent, or Firm* — Foley & Lardner LLP

(57) ABSTRACT

Provided is a polishing composition that is produced at low cost and can impart high-grade mirror finishing to ceramic. The polishing composition includes abrasives, has a pH of 6.0 or more to 9.0 or less, and is used for polishing ceramic.

6 Claims, No Drawings

POLISHING COMPOSITION, POLISHING METHOD, AND METHOD FOR MANUFACTURING CERAMIC COMPONENT

TECHNICAL FIELD

The present invention relates to a polishing composition, a polishing method, and a method for manufacturing a ceramic component.

BACKGROUND ART

As a known technique, the surface of a ceramic component is polished by using a polishing composition including diamond abrasives to perform mirror finishing or smoothing (see, for example, PTLs 1 and 2). The polishing composition including diamond abrasives, however, is expensive and tends to produce scratches and, therefore, has difficulty in obtaining a high-grade mirror surface.

CITATION LIST

Patent Literatures

PTL 1: JP H07-179848 A
PTL 2: JP 2008-290183 A

SUMMARY OF INVENTION

Technical Problem

It is therefore an object of the present invention to provide a polishing composition, a polishing method, and a method for manufacturing a ceramic component that can solve problems of known techniques described above, can be achieved at low cost, and can obtain high-grade mirror finishing of ceramic.

Solution to Problem

To solve the problems, a gist of a polishing composition according to an aspect of the present invention resides in a polishing composition for polishing ceramic including abrasives, and the polishing composition has a pH of 6.0 or more to 9.0 or less.

A gist of a polishing method according to another aspect of the present invention resides in polishing a polishing object by using the polishing composition according to the above aspect.

A gist of a method for manufacturing a ceramic component according to still another aspect of the present invention resides in including polishing a ceramic component by the polishing method according to the above aspect.

Advantageous Effects of Invention

A polishing composition, a polishing method, and a method for manufacturing a ceramic component according to the present invention can be achieved at low costs and provide high-grade mirror finishing of ceramic.

DESCRIPTION OF EMBODIMENT

An embodiment of the present invention will now be described in detail. A polishing composition according to this embodiment is a polishing composition for polishing ceramic, includes abrasives, and has a pH of 6.0 or more to 9.0 or less. The abrasives may contain silica. A difference in zeta potential between ceramic and the abrasives may be 20 mV or more to 60 mV or less.

The polishing composition according to this embodiment is suitable for polishing ceramic and hardly causes scratches, and thus, can perform high-grade glossy mirror finishing on ceramic. In addition, since the polishing composition according to this embodiment does not include diamond abrasives, the polishing composition can be produced at low costs. Furthermore, the polishing composition according to this embodiment can polish ceramic, which has a hardness higher than those of materials such as metals or resins and has difficulty in polishing, at a sufficiently high polishing rate.

Thus, by polishing a ceramic polishing object with the polishing composition according to this embodiment, a ceramic component showing an excellent texture with a mirror-finished surface (e.g., high quality appearance) can be manufactured. Although materials such as metals or resins have limitation on enhancement of surface texture, ceramic, which can obtain more excellent texture by mirror finishing, can be used for manufacturing products with higher customer satisfaction.

Ceramic, which is lightweight and shows strength, durability and can be easily designed, can be used for a material for parts of various products such as adornments (e.g., accessories and watches), electronic equipment (e.g., cellular phones and personal computers), cameras, sports and health care products, dental products (e.g., dentures), and automobile interior members. Among these products, adornments, electronic equipment, and automobile interior members, for example, have high requirements for surface design, and especially high-grade products strongly demand surface design that places importance on texture (e.g., high quality appearance). Thus, the polishing composition according to this embodiment is suitable for production of ceramic components of such products.

As compared to a technique for mirror finishing by applying paining, coating, plating, or the like onto the surface of a ceramic component, a technique for mirror finishing by polishing can obtain an excellent mirror surface, and does not need a paint or a coating. A mirror surface obtained by polishing has durability higher than that of a mirror surface obtained by painting, coating, plating, or the like, and thus, the mirror surface can be sustained for a long period. From these aspects, mirror finishing by polishing is superior to mirror finishing by, for example, painting, coating, plating, or the like.

The "texture" refers to a texture unique to ceramic-containing materials, and can also be expressed as a massive feeling or a presence feeling. The "ceramic" as used herein can provide color tones different from those of metals or resins. Unlike metallic or plastic textures, for example, the texture of ceramic has depth, warmth, and unique glossy appearance, and these features can provide an aesthetic and high quality appearance similar to those of ceramics to persons who see or touch a ceramic product, for example. Since a ceramic product having a mirror surface through polishing is glossy, the ceramic product has a glossy texture different from those of metals or resins. Although the glossy surface is different from those of ceramics as craft or art products, the glossy surface can bear comparison with or more excellent aesthetic or high quality appearance than the surfaces of ceramics as craft or art products. In addition, a ceramic component having a highly smooth surface can provide a pleasant texture and have a high strength in terms of impact resistance or the like.

A polishing composition according to this embodiment will now be described in detail. The following measurements of various operations and properties were performed under conditions at room temperature (20° C. or more to 25° C. or less) and a relative humidity of 40% or more to 50% or less, without otherwise specified.

1. Ceramic as Polishing Object

A ceramic applicable to polishing with the polishing composition according to this embodiment is not limited to a specific type, and may contain, as a main component, an oxide of a metal element such as Mg, Ca, Sr, Ba, Sc, Y, La, Ti, Zr, Hf, V, Nb, Ta, Cr, Mo, W, Mn, Fe, Co, Ni, Cu, Ag, Au, Zn, Al, Ga, In, Sn, Pb, Bi, Ce, Pr, Nd, Er, or Lu. These ceramics may be used singly or in combination of two or more of them.

Among these ceramics, ceramics each containing, as a main component, an oxide of Mg, Y, Ti, Zr, Cr, Mn, Fe, Zn, Al, or Er is preferable as a ceramic to be polished with the polishing composition according to this embodiment, and zirconia and alumina are more preferable.

Except for metal oxide-based ceramics, materials such as aluminum titanate, aluminum nitride, silicon nitride, and silicon carbide are applicable to polishing with the polishing composition according to this embodiment.

Ceramics in the present invention do not include single crystals such as sapphire and silicon carbide.

2. Abrasives

Abrasives included in the polishing composition according to this embodiment are not limited to a specific type, and may be abrasives containing silica. The silica is not limited to a specific type, and may be colloidal silica, fumed silica, or sol-gel-derived silica, for example. These types of silica may be used singly or in combination of two or more of them. Among them, fumed silica and colloidal silica are preferable from the viewpoint of more efficiently smoothing the surface of ceramic.

Colloidal silica may be produced by a known method described below. Examples of the known method include: a method using hydrolysis of alkoxysilane described on pp. 154 to 156 of "Science of the Sol-Gel Method" (published by Agne Shofu Sha) written by Sumio Sakka; a method described in JP 11-60232 A in which methyl silicate or a mixture of methyl silicate and methanol is added dropwise into a mixed solvent composed of water, methanol, and ammonia and an ammonium salt and a reaction between methyl silicate and water is performed; a method described in JP 2001-48520 A in which alkyl silicate is hydrolyzed by using an acid catalyst and thereafter an alkali catalyst is added followed by heating to proceed with polymerization of silicic acid for having particle growth; and a method described in JP 2007-153732 A in which a specific amount of a specific type of hydrolysis catalyst is used for hydrolysis of alkoxysilane. Further examples include a method in which production is performed by ion exchange of sodium silicate.

Examples of a method for producing fumed silica include a method that uses a vapor-phase reaction after vaporizing silicon tetrachloride and combusting it in oxyhydrogen flame. Furthermore, the fumed silica may be prepared as an aqueous dispersion according to a known method. Examples of the method for preparing fumed silica as an aqueous dispersion include methods described in JP 2004-43298 A, JP 2003-176123 A, and JP 2002-309239 A.

The abrasives included in the polishing composition according to this embodiment may have an average primary particle diameter of 5 nm or more, preferably 10 nm or more, and more preferably 15 nm or more. As long as the average primary particle diameter of the abrasives is within the above ranges, the polishing rate of ceramic can be increased. On the other hand, the average primary particle diameter of the abrasives included in the polishing composition according to this embodiment may be 400 nm or less, preferably 300 nm or less, more preferably 200 nm or less, and much more preferably 100 nm or less. As long as the average primary particle diameter of the abrasives is within the above ranges, it is possible to obtain a surface with few defects and low surface roughness by polishing.

In a case where abrasives having large particle diameters and remaining on the surface of polished ceramic cause a problem, it is preferable to perform polishing with a polishing composition using abrasives having small particle diameters (e.g., an average primary particle diameter of 200 μm or less) and not including abrasives with large particle diameters.

The average primary particle diameter of the abrasives can be calculated from a specific surface area measured with, for example, a nitrogen adsorption method (BET method). More specifically, the average primary particle diameter can be obtained by methods described in examples described later.

The content of the abrasives in the polishing composition may be 1 mass % or more and preferably 2 mass % or more. As long as the content of the abrasives is within the above ranges, the polishing rate of ceramic by using the polishing composition can be increased. On the other hand, the content of the abrasives in the polishing composition may be 50 mass % or less, and preferably 45 mass % or less. As long as the content of the abrasives is within the above ranges, production costs of the polishing composition can be reduced. In addition, the content of abrasives remaining on the surface of polished ceramic can be reduced so that cleanness of the surface of ceramic can be enhanced.

3. Zeta Potential

The difference between the zeta potential of ceramic as a polishing object and the zeta potential of abrasives included in the polishing composition according to this embodiment is within the range from 20 mV to 60 mV, inclusive, and preferably from 40 mV to 55 mV, inclusive. As long as the difference of the zeta potentials is within the above ranges, the polishing rate of ceramic by using polishing composition can be further increased.

The zeta potentials of ceramic and the abrasives can be measured by, for example, an electrophoretic light-scattering method or an electroacoustic spectroscopy. Examples of the measurement device include "ELS-Z" manufactured by Otsuka Electronics Co., Ltd. and "DT-1200" manufactured by Dispersion Technology Inc. Measurement of the zeta potential of ceramic may be replaced by measurement of the zeta potential of fine particles composed of a main constituent of ceramic. Alternatively, the polishing object maybe immersed in a liquid containing fine particles having a known zeta potential, taken out from the liquid, and washed with running water for 10 seconds so that whether a sign of the zeta potential of the polishing object in the liquid is positive or negative can be known from the amount of fine particles attached to the surface of the polishing object.

4. Polishing Composition pH

The polishing composition according to this embodiment has a pH of 6.0 or more to 9.0 or less, and preferably 7.0 or more to 8.5 or less. As long as the pH is within these ranges, a polishing rate is high. The reason for such a high polishing rate with the pH in the above ranges is supposed to be related to the zeta potential of ceramic that is a polishing object. The pH of the polishing composition can be adjusted by adding a pH adjuster described later.

5. Additive

The polishing composition according to this embodiment may be supplemented with various additives such as a pH adjuster, an etchant, an oxidizing agent, a water-soluble polymer (that may be a copolymer or a salt or a derivative thereof), an anti-corrosive agent, a chelating agent, a dispersion aid, a preservative, or a mildewproofing agent, as necessary, to enhance performance thereof.

5-1 pH Adjuster

The value of pH of the polishing composition according to this embodiment can be adjusted by adding a pH adjuster. The polishing rate of ceramic and dispersibility of abrasives, for example, may be controlled by adjusting the pH of the polishing composition. The pH adjuster used for adjusting the pH value of the polishing composition to a desired value as necessary may be any of acid or alkali or may be a salt thereof. The amount of addition of the pH adjuster is not limited to a specific amount, and may be adjusted as necessary so that the polishing composition has a desired pH.

Specific examples of the acid as the pH adjuster include inorganic acid and organic acids such as carboxylic acid and organic sulfuric acid. Specific examples of inorganic acid include hydrochloric acid, sulfuric acid, nitric acid, hydrofluoric acid, boric acid, carbonic acid, hypophosphorous acid, phosphorous acid, and phosphoric acid. Specific examples of the carboxylic acid include formic acid, acetic acid, propionic acid, butyric acid, valeric acid, 2-methyl butyric acid, n-hexanoic acid, 3,3-dimethyl butyric acid, 2-ethyl butyric acid, 4-methyl pentanoic acid, n-heptanoic acid, 2-methyl hexanoic acid, n-octanoic acid , 2-ethyl hexanoic acid, benzoic acid, glycolic acid, salicylic acid, glyceric acid, oxalic acid, malonic acid, succinic acid, glutaric acid, adipic acid, pimelic acid, maleic acid, phthalic acid, malic acid, tartaric acid, citric acid, lactic acid , diglycolic acid, 2-furan carboxylic acid, 2,5-furan dicarboxylic acid, 3-furan carboxylic acid, 2-tetrahydrofuroic acid, methoxy acetic acid, methoxy phenyl acetic acid, and phenoxy acetic acid. Specific examples of the organic sulfuric acid include methanesulfonic acid, ethanesulfonic acid, and isethionic acid. These acids may be used singly or in combination of two or more of them.

Among them, sulfuric acid, nitric acid, hydrochloric acid, and phosphoric acid, for example, are preferable among inorganic acids from the viewpoint of enhancement of a polishing rate. Among organic acids, glycolic acid, succinic acid, maleic acid, citric acid, tartaric acid, malic acid, gluconic acid, and itaconic acid, for example, are preferable.

Specific examples of a base as the pH adjuster include amines such as aliphatic amine and aromatic amine, organic bases such as quaternary ammonium hydroxide, hydroxides of alkali metal such as potassium hydroxide, hydroxides of alkaline earth metal, and ammonia. Among them, potassium hydroxide and ammonia are preferable in terms of availability. These bases may be used singly or in combination of two or more of them.

Specific examples of the alkali metal include potassium and sodium. Specific examples of the alkaline earth metal include calcium and strontium. Specific examples of the salts include carbonate, hydrogencarbonate, sulfate, and acetate. Specific examples of the quaternary ammonium include tetramethylammonium, tetraethylammonium, and tetrabutylammonium.

Examples of the quaternary ammonium hydroxide compound include quaternary ammonium hydroxide and a salt thereof. Specific examples thereof include tetramethylammonium hydroxide, tetraethylammonium hydroxide, and tetrabutylammonium hydroxide.

Specific examples of the amines include methylamine, dimethylamine, trimethylamine, ethylamine, diethylamine, triethylamine, ethylenediamine, monoethanolamine, N-(β-aminoethyl) ethanol amine, hexamethylenediamine, diethylenetriamine, triethylenetetramine, anhydrous piperazine, piperazine hexahydrate, 1-(2-aminoethyl) piperazine, N-methylpiperazine, and guanidine.

Instead of or in combination with the acids described above, salts such as ammonium salts or alkali metal salts of the acids may be used as a pH adjuster. In particular, salts of combinations of weak acids and strong bases, strong acids and weak bases, or weak acids and weak bases are preferable. Such salts are expected to exert a buffering effect on pH. In the case of using a salt of a strong acid and a strong base, not only pH but also electric conductivity can be adjusted with a small amount of addition of the pH adjuster.

5-2 Etchant

The polishing composition according to this embodiment may be supplemented with an etchant in order to promote dissolution of ceramic. Examples of the etchant include inorganic acids such as nitric acid, sulfuric acid, hydrochloric acid, phosphoric acid, and hydrogen fluoride, organic acids such as acetic acid, citric acid, tartaric acid, and methanesulfonic acid, inorganic alkalis such as potassium hydroxide and sodium hydroxide, organic alkalis such as ammonia, amine, and quaternary ammonium hydroxide. These etchants may be used singly or in combination of two or more of them.

5-3 Oxidizing Agent

The polishing composition according to this embodiment may be supplemented with an oxidizing agent in order to oxidize the surface of ceramic. Specific examples of the oxidizing agent include hydrogen peroxide, peracetic acid, percarbonates, urea peroxide, perchlorates, persulfates, and nitric acid. Specific examples of the persulfate include sodium persulfate, potassium persulfate, and ammonium persulfate. These oxidizing agents maybe used singly or in combination of two or more of them.

5-4 Water-soluble Polymer

The polishing composition according to this embodiment may be supplemented with a water-soluble polymer (that may be a copolymer or a salt or a derivative thereof) that acts on the surface of ceramic or the surface of abrasives. Specific examples of the water-soluble polymer, the water-soluble copolymer, and salts and derivatives thereof include polycarboxylic acids such as polyacrylate, polyphosphonic acid, polysulfonic acids such as polystyrene sulfonic acid, polysaccharides such as xanthan gum and sodium alginate, cellulose derivatives such as hydroxyethyl cellulose and carboxymethyl cellulose, polyethylene glycol, polyvinyl alcohol, polyvinyl pyrrolidone, sorbitan monooleate, and an oxyalkylene polymer having one or more types of oxyalkylene units. These materials may be used singly or in combination of two or more of them.

5-5 Anti-corrosive Agent

The polishing composition according to this embodiment maybe supplemented with an anti-corrosive agent in order to suppress corrosion of the surface of ceramic. Specific examples of the anti-corrosive agent include amines, pyridines, a tetraphenylphosphonium salt, benzotriazoles, triazoles, tetrazoles, and benzoic acid. These anti-corrosive agents may be used singly or in combination of two or more of them.

5-6 Chelating Agent

The polishing composition according to this embodiment may be supplemented with a chelating agent. Specific examples of the chelating agent include carboxylic acid-based chelating agents such as gluconic acid, amine-based chelating agents such as ethylene diamine, diethylene triamine, and trimethyl tetraamine, polyamino polycarboxylic chelating agents such as ethylenediamine tetraacetic acid, nitrilotriacetic acid, hydroxyethyl ethylenediamine triacetic acid, triethylenetetramine hexaacetic acid, and diethylenetriamine pentaacetic acid, organic phosphonic acid-based chelating agents such as 2-aminoethyl phosphonic acid, 1-hydroxyethylidene-1,1-diphosphonic acid, amino tri(methylene phosphonic acid), ethylene diamine tetrakis(methylene phosphonic acid), diethylenetriamine penta (methylene phosphonic acid), ethane-1,1-diphosphonic acid, ethane-1,1,2-triphosphonic acid, methanehydroxy phosphonic acid, and 1-phosphonobutane-2,3,4-tricarboxylic acid, a phenol derivative, and 1,3-diketone. These chelating agents maybe used singly or in combination of two or more of them.

5-7 Dispersion Aid

The polishing composition according to this embodiment may be supplemented with a dispersion aid in order to ease redispersion of an aggregate of abrasives. Specific examples of the dispersion aid include condensed phosphate salts such as pyrophosphate salts and hexametaphosphate salts. These dispersion aids may be used singly or in combination of two or more of them.

5-8 Preservative

The polishing composition according to this embodiment may be supplemented with a preservative. Specific examples of the preservative include sodium hypochlorite. These preservatives may be used singly or in combination of two or more of them.

5-9 Mildewproofing Agent

The polishing composition according to this embodiment may be supplemented with a mildewproofing agent. Specific examples of the mildewproofing agent include oxazoline such as oxazolidine-2,5-dione.

6. Liquid Medium

The polishing composition according to this embodiment may include abrasives, water, and a liquid medium such as an organic solvent. At this time, various additives may be added as necessary.

The liquid medium functions as a dispersion medium or a solvent for dispersing or dissolving components (e.g., abrasives and additives) of the polishing composition. Examples of the liquid medium include water and organic solvents. These materials may be used singly or in combination of two or more of them. The liquid medium preferably includes water. From the viewpoint of suppressing inhibition of functions of components, water containing impurities as little as possible is preferably used. Specifically, pure water, ultrapure water, or distilled water from which foreign matters are removed through a filter after removal of impurity ions by using an ion-exchange resin is preferably used.

7. Method for Producing Polishing Composition

A method for producing a polishing composition according to this embodiment is not limited to a specific method, and a polishing composition can be produced by stirring and mixing abrasives and additives as necessary in a liquid medium such as water. For example, the polishing composition can be produced by stirring and mixing abrasives of silica and additives such as a pH adjuster in water. A temperature in mixing is not limited to a specific temperature, and temperatures of 10° C. or more to 40° C. or less are preferable. Heating may be performed in order to increase a dissolution rate. A mixing time is not limited to a specific time.

8. Polishing Method and Method for Manufacturing Ceramic Component

Polishing of ceramic with a polishing composition according to this embodiment can be performed with a polishing device under polishing conditions that are employed in typical polishing. For example, a single-side polishing device or a double-side polishing device can be used.

For example, in a case where a ceramic component as a polishing object is a ceramic board and polishing is performed with a single-side polishing device, the board is held with a holder called a carrier and a surface plate to which a polishing cloth is attached is pushed against one side of the board and a surface plate is rotated with a supply of the polishing composition so that the surface of the board is polished.

In a case where a ceramic board is polished with a double-side polishing device, the board is held with a holder called a carrier and surface plates to each of which a polishing cloth is attached are pushed against both surfaces of the board and the surface plates are rotated with a supply of the polishing composition so that the surfaces of the board are polished.

In each of the cases of using the polishing devices described above, the board is polished by a physical action by friction (friction between the polishing cloth and the polishing composition and ceramic) and a chemical action of the polishing composition on ceramic.

In a typical polishing method of polishing a ceramic component by using a polishing composition including diamond abrasives, polishing is performed by using a surface plate of copper, cast iron, tin, a tin alloy, or a sintered mixture of at least one of these metals and a resin. On the other hand, in a polishing method of polishing a ceramic component by using a polishing composition according to this embodiment, polishing can be performed by using a surface plate to which a polishing cloth is attached so that a resulting mirror surface is more excellent than that obtained in the typical polishing method.

As the polishing cloth, various materials such as polyurethane, nonwoven fabric, or suede may be used. Various types of polishing clothes having different properties in, for example, hardness or thickness as well as material may be used. In addition, although both a polishing composition including abrasives and a polishing composition including no abrasives may be used, the polishing composition including no abrasives is preferably used.

Furthermore, among polishing conditions, a polishing load (pressure applied to a polishing object) is not limited to a specific load, and may be 4.9 kPa (50 gf/cm$^2$) or more to 98 kPa (1000 gf/cm$^2$) or less, preferably 7.8 kPa (80 gf/cm$^2$) or more to 78 kPa (800 gf/cm$^2$) or less, and more preferably 9.8 kPa (100 gf/cm$^2$) or more to 59 kPa (600 gf/cm$^2$) or less. As long as the polishing load is within these ranges, a sufficient polishing rate is obtained so that it is possible to suppress damage of a polishing object caused by a load or to suppress occurrence of defects such as scratches in the surface of the polishing object.

Among polishing conditions, a polishing rate (linear rate) is not limited to a specific rate, and may be 10 m/min or more to 300 m/min or less, and preferably 30 m/min or more to 200 m/min or less. As long as the polishing rate (linear rate) is within these ranges, a sufficient polishing rate can be obtained. In addition, damage of the polishing cloth caused by friction of the polishing object can be reduced, and friction is sufficiently transferred to the polishing object so that so-called slipping of the polishing object caused can be reduced. As a result, polishing can be sufficiently performed.

Among polishing conditions, the amount of supply of the polishing composition varies depending on the type of the polishing object, the type of the polishing device, and polishing conditions, and only needs to be sufficient for uniformly supplying the polishing composition onto the entire surface between the polishing object and the polishing cloth. In a case where the amount of supply of the polishing composition is small, the polishing composition might fail to be supplied to the entire polishing object, or the polishing composition might be dried and solidified to cause defects in the surface of the polishing object. In contrast, in a case where the amount of supply of the polishing composition is large, this case is not economical, and the excessive polishing composition (especially a liquid medium such as water) reduces friction so that polishing might be inhibited.

Before a main polishing step of performing polishing using the polishing composition according to this embodiment, a preliminary polishing step of performing polishing using another polishing composition may be performed. In a case where the surface of the polishing object suffers from damage in processing, scratches during transportation, or the like, obtaining a mirror surface from the surface including damage or the like with one polishing step takes a long time, and thus, is uneconomical. In addition, smoothness of the surface of the polishing object might be impaired.

In view of this, surface scratches on the surface of the polishing object are removed by the preliminary polishing step beforehand so that a polishing time necessary for the main polishing step using the polishing composition according to this embodiment can be shortened. As a result, an excellent mirror surface can be efficiently obtained. As a preliminary polishing composition used in the preliminary polishing step, a polishing composition having a polishing power higher than that of the polishing composition according to this embodiment is preferably used. Specifically, abrasives having a higher hardness and a larger average secondary particle diameter than those of abrasives used in the polishing composition according to this embodiment are preferably used.

Abrasives included in the preliminary polishing composition are not limited to a specific type, and may be, for example, boron carbide, silicon carbide, aluminium oxide (alumina), zirconia, zircon, ceria, or titania. These materials may be used singly or in combination of two or more of them. Among these abrasives, boron carbide and silicon carbide are especially preferable as abrasives included in the preliminary polishing composition. Boron carbide or silicon carbide may include an impurity element such as iron or carbon.

The average secondary particle diameter of abrasives included in the preliminary polishing composition may be 0.1 µm or more, and preferably 0.3 µm or more. The average secondary particle diameter of abrasives included in the preliminary polishing composition may be 20 µm or less, and preferably 5 µm or less. As the average secondary particle diameter of the abrasives included in the preliminary polishing composition decreases, a surface having a smaller number of defects and a lower surface roughness can be easily obtained. The average secondary particle diameter of the abrasives included in the preliminary polishing composition can be measured by an electric resistance method, for example. Examples of a device using the electric resistance method include Multisizer III manufactured by Beckman Coulter, Inc.

The content of abrasives in the preliminary polishing composition may be 0.5 mass % or more, and preferably 1 mass % or more. As the content of the abrasives increases, the polishing rate of ceramic by using the preliminary polishing composition increases. On the other hand, the content of abrasives in the preliminary polishing composition may be 40 mass % or less, and preferably 30 mass % or less. As the content of the abrasives decreases, production cost of the preliminary polishing composition decreases.

In addition, in a manner similar to the pH of the polishing composition according to this embodiment, a preferable pH of the preliminary polishing composition varies depending on the type of ceramic as a polishing object, the type of abrasives, the average secondary particle diameter of the abrasives, and a production history of the abrasives, for example. In a manner similar to the pH of the polishing composition according to this embodiment, the pH of the preliminary polishing composition is adjusted by adjusting acid, base, or a salt thereof.

In addition, in a manner similar to the polishing composition according to this embodiment, the preliminary polishing composition may be supplemented with additives as necessary, and may include a redispersing agent, for example. Examples of the redispersing agent include fine particles having an average secondary particle diameter of 0.2 µm or less, and a water-soluble polymer, a water-soluble copolymer, or a salt thereof added to the polishing composition according to this embodiment as necessary.

Fine particles having an average secondary particle diameter of 0.2 µm or less are not limited to a specific type. Examples of the fine particles include alumina, zirconia, zircon, ceria, titania, silica, chromium oxide, iron oxide, silicon nitride, titanium nitride, titanium boride, tungsten boride, and manganese oxide. These fine particles may be used singly or in combination of two or more of them. Fine particles of a mixture of two or more of the materials described above may be used.

Among them, metal oxide is preferable in terms of availability and low cost, and alumina (e.g., α-alumina, intermediate alumina, fumed alumina, alumina sol, and mixtures thereof), hydrated alumina (e.g., boehmite), aluminium hydroxide, silica (e.g., colloidal silica, fumed silica, and sol-gel-derived silica) are more preferable.

From the viewpoint availability, the average secondary particle diameter of the fine particles is preferably 0.005 µm or more and more preferably 0.01 µm or more. The average secondary particle diameter of the fine particles is preferably 0.5 µm or less, more preferably 0.2 µm or less, and much more preferably 0.1 µm or less. As long as the average secondary particle diameter of the fine particles is within the ranges described above, costs can be reduced, and in addition, sedimentation of abrasives themselves is less likely to occur, and redispersion of abrasives in the preliminary polishing composition can be further enhanced. The average secondary particle diameter of the fine particles can be measured by, for example, dynamic light scattering. Examples of a measuring device using dynamic light scattering include UPA-UT151 manufactured by NIKKISO CO., LTD.

The polishing composition according to this embodiment can be collected after having been used for polishing of a polishing object and then reused for polishing the polishing object. As an example method of reusing the polishing composition, a method of collecting the polishing composition discharged from a polishing device in a tank, circulating the collected polishing composition to the polishing device again, and using the polishing composition for polishing may be used. By using such a circulated polishing composition, the amount of the polishing composition discharged as waste liquid can be reduced so that an environmental load can be reduced. In addition, the amount of the polishing composition used can also be reduced so that a manufacturing cost necessary for polishing a polishing object can be reduced.

In reusing the polishing composition according to this embodiment, a part or the whole of abrasives, an additive, and other materials that have been consumed and lost when used for polishing may be added as a composition adjusting agent before reuse. As the composition adjusting agent, a mixture of abrasives, an additive, and other materials in an arbitrary mixing ratio may be used. Addition of the composition adjusting agent enables the polishing composition to be adjusted to a composition suitable for reuse so that suitable polishing can be performed. The concentrations of abrasives and other additives included in the composition adjusting agent may be at arbitrary levels, and are not limited to specific concentrations. The concentrations may be adjusted depending on the size of the tank and polishing conditions as necessary.

The polishing composition according to this embodiment may be of a one-component type or a multi-component type such as a two-component type in which components of the polishing composition are partially or entirely mixed in an arbitrary ratio. In polishing a polishing object, polishing may be performed by using an undiluted solution of the polishing composition according to this embodiment without dilution, and may be performed by using a diluent of a polishing composition diluted to 10 times or more with a diluent of water or the like, for example.

EXAMPLES

Examples will now be presented below to specifically describe the present invention with reference to Table 1.

Abrasives of silica, water as a liquid medium, and a pH adjuster as an additive were mixed and abrasives were dispersed in water so that polishing compositions of Examples 1 to 3 and Comparative Examples 1 to 5 were produced. For the polishing composition (pH 12.0) of Comparative Example 5, potassium hydroxide was used as a pH adjuster, and for other polishing compositions (pH 2.0 to 9.7), nitric acid was used as a pH adjuster.

In each of Examples 1 to 3 and Comparative Examples 1 to 5, silica used as abrasives had an average primary particle diameter of 45 nm. In each of Examples 1 to 3 and Comparative Examples 1 to 5, the content of abrasives in the entire polishing composition was 23 mass %.

The average primary particle diameter of abrasives was calculated from a specific surface area and a density of abrasives measured by a BET method with "Flow SorbII 2300" manufactured by Micromeritics.

With the polishing compositions of Examples 1 to 3 and Comparative Examples 1 to 5, a rectangular plate member (with dimensions of 60 mm in length and 80 mm in width) of white zirconia ceramic was polished under polishing conditions described below. Then, amass of the rectangular plate member before polishing and a mass of the rectangular plate member after polishing were measured. From a difference between the mass before polishing and the mass after polishing, a polishing rate was calculated. Table 1 indicates results.

TABLE 1

| | | pH | Zeta potential difference (mV) | Polishing rate (µm/min) |
|---|---|---|---|---|
| Comparative Example | 1 | 2.0 | 65 | 0.028 |
| | 2 | 4.0 | 59 | 0.025 |
| | 3 | 5.5 | 69 | 0.027 |
| | 4 | 9.7 | 37 | 0.025 |
| | 5 | 12.0 | 21 | 0.018 |
| Example | 1 | 8.0 | 48 | 0.035 |
| | 2 | 7.5 | 60 | 0.030 |
| | 3 | 8.5 | 40 | 0.029 |

(Polishing Conditions)
Polishing Device: single-side polishing device (surface plate diameter: 380 mm)
Polishing cloth: polyurethane polishing cloth
Polishing load: 17.6 kPa (180 gf/cm$^2$)
Rotation speed of surface plate: 90 min$^{-1}$
Polishing rate (linear rate): 71.5 m/min
Polishing time: 15 min
Supply rate of polishing composition: 26 mL/min Table 2 indicates zeta potentials of silica, zirconia, and alumina. As indicated in Table 2, the zeta potential varies depending on pH. From the zeta potentials indicated in Table 2, a difference between a zeta potential of a polishing object (zirconia) and a zeta potential of abrasives (silica) included in the polishing composition at each pH was calculated. Table 1 indicates calculated differences in zeta potential.

TABLE 2

| | pH | | | | | | | | | | | |
|---|---|---|---|---|---|---|---|---|---|---|---|---|
| | 2 | 3 | 4 | 5 | 6 | 7 | 8 | 9 | 10 | 10.5 | 11 | 12 |
| Silica zeta potential | −10 | −21 | −29 | −38 | −49 | −60 | −63 | −65 | −67 | — | −66 | −66 |
| Zirconia zeta potential | 55 | 35 | 30 | 30 | 25 | 0 | −15 | −25 | −30 | — | −35 | −45 |
| Alumina zeta potential | 73 | 75 | 67 | 63 | 48 | 27 | 2 | −24 | −49 | −61 | — | — |

* Zeta potential unit is mV.

As indicated in Table 1, the polishing rates of Examples 1 to 3 are higher than those of Comparative Examples 1 to 5. In each Example, the surface of the rectangular plate member of white zirconia ceramic was a high-grade mirror surface with few scratches.

In a case where the difference from the zeta potential of zirconia is at the same level (e.g., in the case where pH is 7), even when alumina was used as abrasives, results similar to Examples using silica as abrasives were obtained.

The invention claimed is:

1. A polishing composition for polishing zirconia, the polishing composition comprising abrasives consisting of silica, wherein
   the polishing composition has a pH of more than 7.0 to 9.0 or less;
   a difference between a zeta potential of the zirconia and a zeta potential of the abrasives is 20 mV or more to 60 mV or less; and
   the zeta potential of the zirconia is less than 0 mV and the zeta potential of the abrasives consisting of silica is less than 0 mV.

2. The polishing composition according to claim 1, wherein the difference between the zeta potential of the zirconia and the zeta potential of the abrasives is 40 mV or more to 60 mV or less.

3. A method for manufacturing a zirconia component, the method comprising polishing a zirconia component using the polishing composition according to claim 1.

4. A polishing method for polishing a polishing object, the method using the polishing composition according to claim 1.

5. A polishing method for polishing a polishing object, the method using the polishing composition according to claim 2.

6. A polishing method for polishing a polishing object comprising zirconia, the method using the polishing composition according to claim 1.

* * * * *